United States Patent
Leber

(10) Patent No.: US 7,044,279 B2
(45) Date of Patent: May 16, 2006

(54) HYDRODYNAMIC TORQUE CONVERTER

(75) Inventor: Fritz Leber, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/773,657

(22) Filed: Feb. 6, 2004

(65) Prior Publication Data
US 2004/0188210 A1   Sep. 30, 2004

(30) Foreign Application Priority Data
Mar. 28, 2003  (DE)  ............... 103 14 332

(51) Int. Cl.
*F16H 45/02*  (2006.01)
(52) U.S. Cl. ............ 192/3.25; 192/48.1; 192/87.1
(58) Field of Classification Search ........... 192/3.25, 192/3.26, 3.3, 3.33, 48.1, 48.8, 87.1, 87.13, 192/109 F
See application file for complete search history.

(56) References Cited

U.S. PATENT DOCUMENTS

| | | | |
|---|---|---|---|
| 3,326,338 A | 6/1967 | Mattli | 192/3.3 |
| 3,537,262 A | 11/1970 | Briski | 60/54 |
| 3,820,417 A * | 6/1974 | Allen et al. | 475/65 |
| 4,066,157 A * | 1/1978 | Gibbs | 192/3.24 |
| H964 H * | 9/1991 | Olson et al. | 324/174 |
| 5,318,159 A * | 6/1994 | Kashiwabara | 477/169 |
| 5,456,333 A * | 10/1995 | Brandt et al. | 180/336 |
| 5,509,520 A | 4/1996 | Evans et al. | 192/3.23 |
| 5,613,581 A * | 3/1997 | Fonkalsrud et al. | 192/3.23 |
| 5,699,887 A | 12/1997 | Kundermann | 192/3.26 |
| 5,755,638 A * | 5/1998 | Suzuki | 477/62 |
| 5,947,242 A * | 9/1999 | Creger | 192/3.23 |
| 6,494,303 B1 | 12/2002 | Reik et al. | 192/3.29 |
| 2004/0188207 A1* | 9/2004 | Leber | 192/3.25 |
| 2004/0188209 A1* | 9/2004 | Leber | 192/3.25 |

FOREIGN PATENT DOCUMENTS

| | | |
|---|---|---|
| DE | 1 550 973 | 10/1969 |
| DE | 2 006 955 | 9/1970 |
| DE | 1 625 009 | 5/1971 |
| DE | 195 21 458 A1 | 12/1995 |
| DE | 195 08 613 A1 | 9/1996 |
| DE | 100 24 191 A1 | 11/2000 |
| DE | 100 52 605 A1 | 5/2002 |
| JP | 58131463 | 8/1983 |
| JP | 59140961 A | 8/1984 |
| JP | 61167767 A | 7/1986 |
| JP | 2001271906 A | 10/2001 |

* cited by examiner

*Primary Examiner*—Saul Rodriguez
(74) *Attorney, Agent, or Firm*—Davis & Bujold, P.L.L.C.

(57) ABSTRACT

To achieve precise control of a clutch arranged inside a converter housing (1) and which connects the converter housing (1) to a pump impeller wheel (3), the converter's internal pressure, which acts on a piston (9) of the actuation device of a clutch (2), is determined by a pressure sensor (12) and the actuation pressure, which acts on the piston (9) in the opposite direction, is adjusted accordingly.

17 Claims, 2 Drawing Sheets

HYDRODYNAMIC TORQUE CONVERTER

This application claims priority from German Application Serial No. 103 14 332.7 filed Mar. 28, 2003.

FIELD OF THE INVENTION

The invention concerns a hydrodynamic torque converter.

BACKGROUND OF THE INVENTION

Hydrodynamic torque converters of this type comprise a converter housing which is connected to a drive engine. The engine or the converter housing forms the drive unit and drives a pump impeller. The turbine rotor forms the drive output and is preferably connected to a change-under-load transmission, in particular for working machines such as wheel loaders or stackers. The pump impeller wheel can be connected to the drive by a clutch.

DE 195 21 458 A1 discloses an electro-hydraulic control device for the drive of a machine with a hydrodynamic torque converter, in which the pump impeller wheel can be connected to the drive by a clutch.

The purpose of the present invention is to provide a hydrodynamic torque converter in which the pump impeller wheel can be connected to the drive by a clutch, and in which the said clutch can be controlled with precision.

SUMMARY OF THE INVENTION

According to the invention, the pump impeller wheel can be connected to the converter housing by a clutch, the actuating device of the clutch being a piston on one side of which acts the internal pressure of the converter and on the other side of which acts the clutch actuation pressure. Depending on which pressure predominates, the clutch is actuated to close or open. The resulting force, which acts on the piston, is the net force produced by the differential pressure between the actuation pressure and the pressure inside the converter housing. Since the pressure inside the converter housing varies according to the operating conditions of the hydrodynamic torque converter, the clutch can only be controlled with precision if the actuation pressure takes into account the moment-by-moment pressure inside the converter housing. For this purpose, the pressure in the converter housing is measured by a pressure sensor, preferably at a tapping point close to the piston of the clutch actuation device. The signal from the pressure sensor is fed to an electronic control device, which emits control signals for the actuation pressure of the clutch as a function of the internal pressure. Preferably, the pressure is determined by a pressure sensor arranged in a component whose position is fixed. Preferably, this positionally fixed component is connected to the inside space of the converter by a rotary connection and a pressure line. Preferably, the pressure line opens close to the piston inside the converter housing.

It is also possible to feed the pressure inside the converter housing to the tapping point of a hydraulic control unit, which regulates the clutch actuation pressure as a function of the pressure inside the converter.

In another embodiment, the piston can have apertures through which the pressure medium, which acts directly on the piston, transmits the pressure to the pressure sensor. Preferably, the duct for transmitting the pressure is arranged inside the converter housing.

In a further embodiment, in the positionally fixed component in which the pressure sensor is arranged, there is also a bore through which the pressure medium is fed into the clutch actuation space. The positionally fixed component can also have a bore through which a coolant liquid is fed into the space inside the converter housing, this liquid flowing continually through the converter to cool it.

In a further embodiment the positionally fixed component is connected to the stator of the hydrodynamic torque converter.

Since the pressure sensor determines the momentary internal pressure acting on the piston and transmits it to an electronic control unit, the actuation pressure can be varied as a function of the converter's internal pressure and the clutch can, therefore, be controlled with precision.

BRIEF DESCRIPTION OF THE DRAWINGS

The invention will now be described, by way of example, with reference to the accompanying drawings in which.

DETAILED DESCRIPTION OF THE INVENTION

Figure 1:
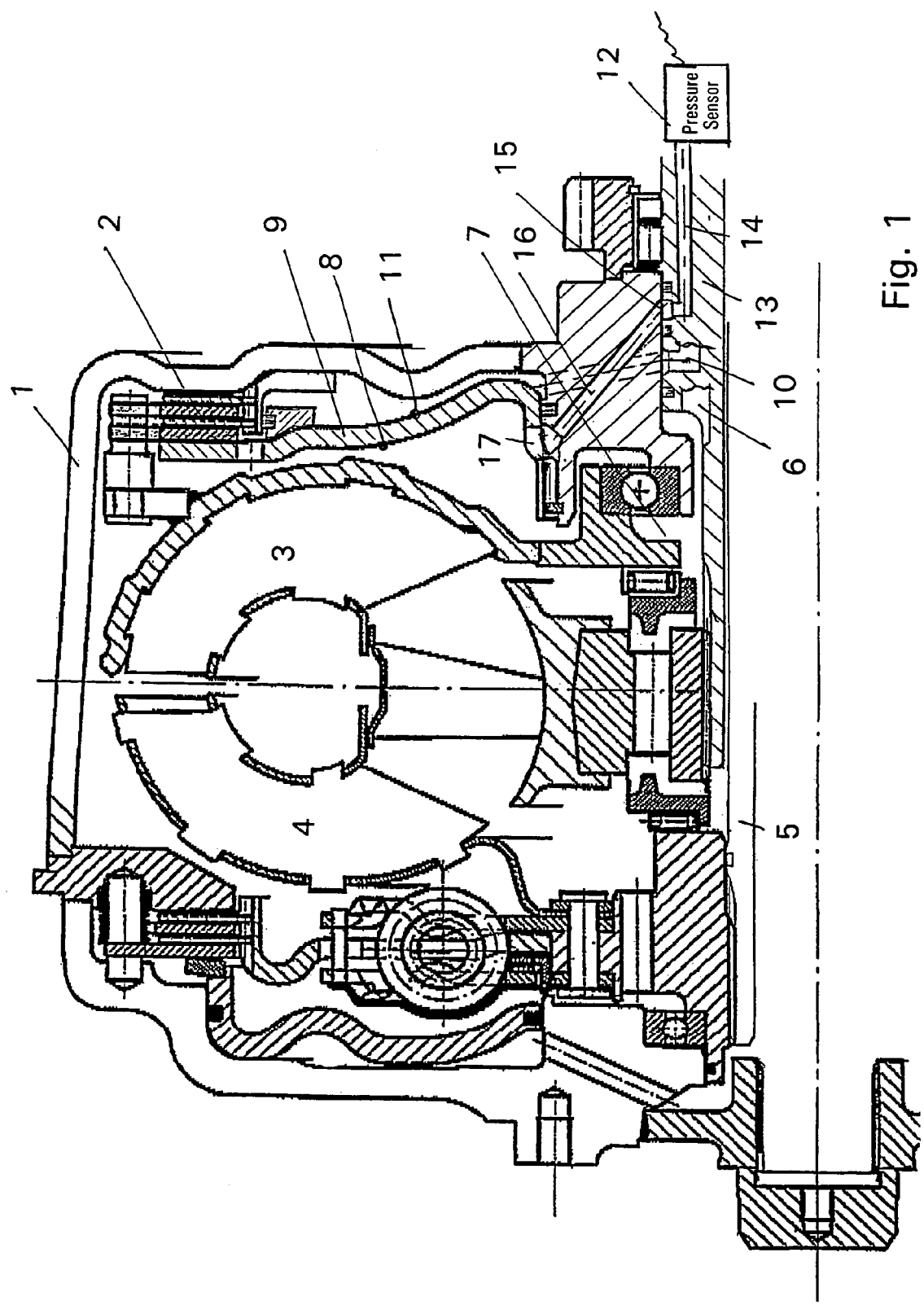
FIG. 1 is a torque converter with apertures in the piston.

FIG. 1:

A converter housing 1, which is in rotationally fixed connection with a drive engine (not shown), can be connected to a pump impeller wheel 3 by a clutch 2. A turbine rotor 4 is in rotationally fixed connection with a shaft 5 which constitutes the drive output and is preferably connected to a change-under-load transmission. Via a line 6, coolant liquid is continuously fed into an inside space 7 of the converter, whereby, as a function of the quantity of coolant liquid and the operating condition of the hydrodynamic torque converter, a pressure is produced in the inside space of the converter, which acts on a first side 8 of a piston 9 of the actuation device for the clutch 2. Pressure medium is fed to a second side 11 of the piston 9 via a pressure feed line 10. The net pressure force acting on the piston 9 is determined by the difference between the pressure forces acting on the first side 8 and on the second side 11 of the piston 9. To enable precise control of the clutch 2, the pressure force acting on the second side 11 must be adjusted as a function of the constantly varying pressure force acting on the first side 8. For this purpose, a pressure sensor 12 preferably arranged in a positionally fixed component 13 determines the pressure acting on the first side 8 of the piston 9, via a first pressure line 14, a rotary connection 15, a second pressure line 16 and apertures 17 in the piston 9. Since the second pressure line 16 and the apertures 17 are arranged in the direct vicinity of and thus close to the first side 8, the pressure sensor 12 can determine with precision the pressure acting on the first side 8. Preferably, the line 6, the pressure feed line 14 and the pressure sensor 12 are arranged within the positionally fixed component.

Figure 2:
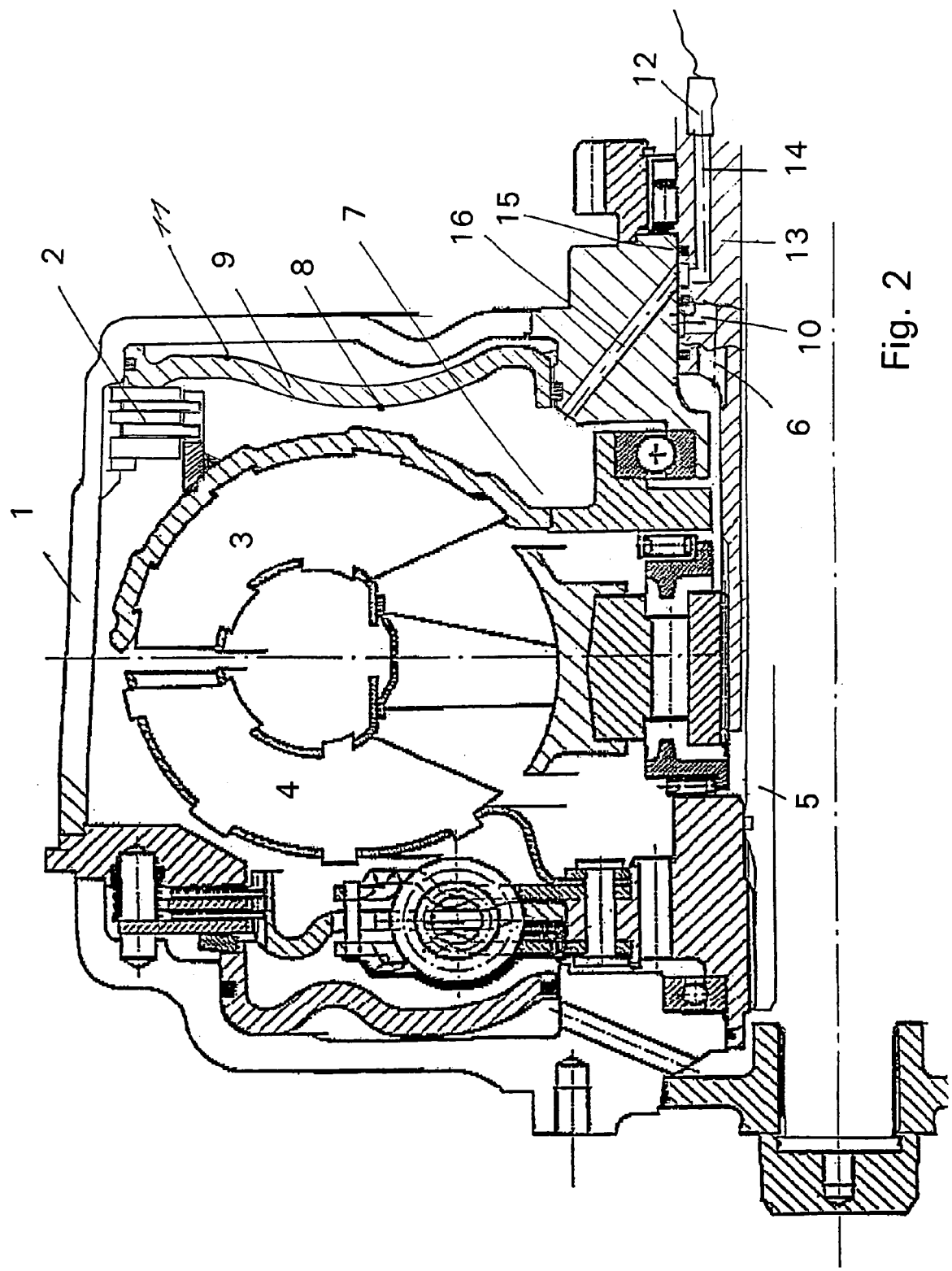
FIG. 2 is a torque converter with a pressure line in the converter housing.

FIG. 2:

The hydrodynamic torque converter of FIG. 2 works in a manner analogous to the torque converter of FIG. 1, but such that the torque converter of FIG. 2 actuates the clutch 2 in its opening direction when the converter's internal pressure, which acts on the first side 8 of the piston 9, is greater than the actuation pressure acting on the second side 11 of the piston 9. The clutch 2 in FIG. 1 is actuated in the opening direction when the converter's internal pressure acting on the second side 11 of the piston 9 is greater than the actuation pressure acting on the first side 8 of the piston 9. Accordingly, the piston 9 in FIG. 2 needs no rotationally fixed connection to the converter housing, since when the clutch 2 is closed the piston 9 has the same rotation direction as the disk of the clutch 2. Therefore, it is possible for the line 16 to open directly into the pressure space which acts on the first side 8 of the piston 9, so that the pressure sensor 12 can determine the pressure within that space. Apertures 17 such as those on the piston of FIG. 1 are not needed.

REFERENCE NUMERALS

1 Converter housing
2 Clutch
3 Pump impeller wheel
4 Turbine rotor
5 Shaft
6 Feed line
7 Inside space of the converter
8 First side of the piston
9 Piston
10 Pressure feed line
11 Second side of the piston
12 Pressure sensor
13 Positionally fixed component
14 First pressure line
15 Rotary connection
16 Second pressure line
17 Apertures

The invention claimed is:

1. A hydrodynamic torque converter comprising:
   a clutch (2) arranged inside a converter housing (1), said clutch connecting a pump impeller wheel (3) to a drive;
   a drive engine; and
   a turbine rotor (4) forms a drive output, and a pressure sensor (12) connected to an inner space of the converter determines the pressure inside the converter housing (1); and
   wherein the converter housing (1) has a pressure line (16) through which the converter's internal pressure is transmitted via a rotary connection (15) to a positionally fixed component (13) in which the pressure sensor in arranged.

2. The hydrodynamic torque converter according to claim 1, wherein the clutch (2) is actuated by an actuation device with a piston (9), with a pressure inside the inner space of the converter housing (1) acting on one side of the piston (9) and an actuation pressure acting on another side.

3. The hydrodynamic torque converter according to claim 2, wherein the piston (9) has at least one aperture (17) through which the converter's internal pressure is transmitted to a pressure line (16).

4. The hydrodynamic torque converter according to claim 1, wherein the positionally fixed component (13) is connected to a stator of the torque converter.

5. The Hydrodynamic torque converter according to claim 1, wherein a pressure feed line (10) to an actuation device for the clutch (2) and a coolant liquid feed line (6) are arranged in the positionally fixed component (13).

6. A hydrodynamic torque converter, comprising:
   a clutch (2) arranged inside a rotatable converter housing (1), said clutch having a piston for connecting a pump impeller wheel (3) to a drive;
   a turbine rotor (4) forms a drive output,
   a pressure within the converter housing (1) is fed via a tapping point in the converter housing adjacent the piston to a hydraulic control unit, which controls an actuation pressure of the clutch (2) as a function of the pressure within a converter housing (1); and
   wherein the tapping point in the rotatable converter housing (1) communicates with a pressure line (16) through which the converter's internal pressure is transmitted from the rotatable converter housing (1) via a rotary connection (15) to a relatively fixed component (13) in which the pressure sensor in arranged.

7. A hydrodynamic torque converter for a drive train of a vehicle comprising:
   a converter housing connected to a drive engine, the converter housing containing;
      a pump impeller for connecting with the converter housing;
      a turbine rotor (4) having a turbine shaft forming an output drive,
      a clutch (2) arranged inside the converter housing (1) for connecting the pump impeller wheel (3) to the converter housing according to an applied clutch pressure;
   a pressure sensor (12) directly connected with an inner space of the converter housing via a fluid passage to determine a pressure inside the converter housing (1) and regulate the applied clutch pressure as a function of the pressure inside the converter; and
   wherein the pressure sensor (12) is arranged in a positionally fixed component (13) radially aligned between the turbine shaft and the converter housing.

8. The hydrodynamic torque converter according to claim 7, wherein the clutch (2) is actuated by an actuation device with a piston (9), with the pressure inside the inner space of the converter housing (1) acting on one side of the piston (9) and an actuation pressure acting on another side.

9. The hydrodynamic torque converter according to claim 8, wherein the piston (9) has at least one aperture (17) through which the pressure inside an inner space of the converter housing (1) is transmitted to a pressure line (16).

10. The hydrodynamic torque converter according to claim 7, wherein the positionally fixed component (13) is connected to a stator of the torque converter.

11. The hydrodynamic torque converter according to claim 7, wherein a pressure feed line (10) to an actuation device for the clutch (2) and a coolant liquid feed line (6) are arranged in the positionally fixed component (13).

12. A hydrodynamic torque converter comprising:
   a clutch (2) arranged inside a converter housing (1), said clutch having a piston for connecting a pump impeller wheel (3) to a drive input from a drive engine;
   a turbine rotor (4) forms a drive output in a turbine shaft of the torque converter;
   a pressure sensor arranged in a positionally fixed component (12) communicates via a rotary pressure sensing line with an inner space of the converter to determine the pressure inside the converter housing (1); and
   wherein the rotary pressure sensing line communicates with the inner space of the converter housing on a first side of the piston and an aperture is provided in the piston of the clutch to provide communication of the rotary pressure sensing line with a fluid pressure on an opposing second side of the piston.

13. The hydrodynamic torque converter as set forth in claim 12 wherein the rotary pressure sensing line is formed in the converter housing (1).

14. The hydrodynamic torque converter as set forth in claim 13 wherein a stationary pressure sensing line formed in the positionally fixed component (12) connects to the rotary pressure sensing line in the converter housing via a rotary connection.

15. The hydrodynamic torque converter as set forth in claim 14 wherein the rotary pressure sensing line is not formed in the turbine shaft (5).

16. A hydrodynamic torque converter comprising:
    a clutch (2) arranged inside a converter housing (1), said clutch having a piston for connecting a pump impeller wheel (3) to a drive input from a drive engine;
    a turbine rotor (4) forms a drive output in a turbine shaft of the torque converter;
    a pressure sensor arranged in a positionally fixed component (12) communicates via a rotary pressure sensing line with an inner space of the converter to determine the pressure inside the converter housing (1); and
    wherein the rotary pressure sensing line extends through the converter housing and communicates with the inner space of the converter housing on one side of the piston and a stationary pressure sensing line formed in the positionally fixed component (12) connects to the rotary pressure sensing line formed in the converter housing via a rotary connection.

17. The hydrodynamic torque converter as set forth in claim 16 wherein the positionally fixed component is radially situated between the turbine shaft (5) and the converter housing (1) and the rotary pressure sensing line is formed solely in the converter housing (1).

\* \* \* \* \*